United States Patent [19]

Richaud et al.

[11] 4,074,585
[45] Feb. 21, 1978

[54] BALL SCREW

[75] Inventors: Aimé A. Richaud; Pierre F. Moreno; Guy A. Rimbaud, all of Forcalquier, France

[73] Assignee: L'Agence Nationale de Valorisation de la Recherche ANVAR, Neuilly-sur-Seine, France

[21] Appl. No.: 552,209

[22] Filed: Feb. 24, 1975

[30] Foreign Application Priority Data

Feb. 26, 1974 France .................................. 74 06446

[51] Int. Cl.² ............................................. F16H 1/18
[52] U.S. Cl. .................................. 74/424.8 R; 74/459
[58] Field of Search ........................... 74/459, 424.8 R

[56] References Cited

U.S. PATENT DOCUMENTS 3,313,873  4/1967  Dembiak .................................. 74/459

FOREIGN PATENT DOCUMENTS 1,129,792  5/1962  Germany ................................ 74/459

Primary Examiner—Samuel Scott
Assistant Examiner—Wesley S. Ratliff, Jr.
Attorney, Agent, or Firm—Lewis H. Eslinger

[57] ABSTRACT

A mechanism for converting rotary motion into translatory motion including a threaded shaft, an internally threaded sleeve surrounding the shaft and a plurality of balls in a helical passage defined between the sleeve and shaft by the threads, comprises a channel for transferring the balls between opposite ends of the passage which includes a longitudinal bore in the sleeve and, in each of two identical annular end plates secured to either end of the sleeve, an arcuate recess formed by a central bore portion of increased radius, and a linear groove having opposite ends communicating with the recess and the sleeve bore. The end plates which may be moulded from self-lubricating plastics material may have stops adjacent the inner ends of the groove which project inwardly between adjacent threads of the groove to guide the balls into the groove. The ends of the sleeve bore may be chamfered and the outer end walls of the grooves inclined to aid transfer of the balls between the bore and groove.

6 Claims, 4 Drawing Figures

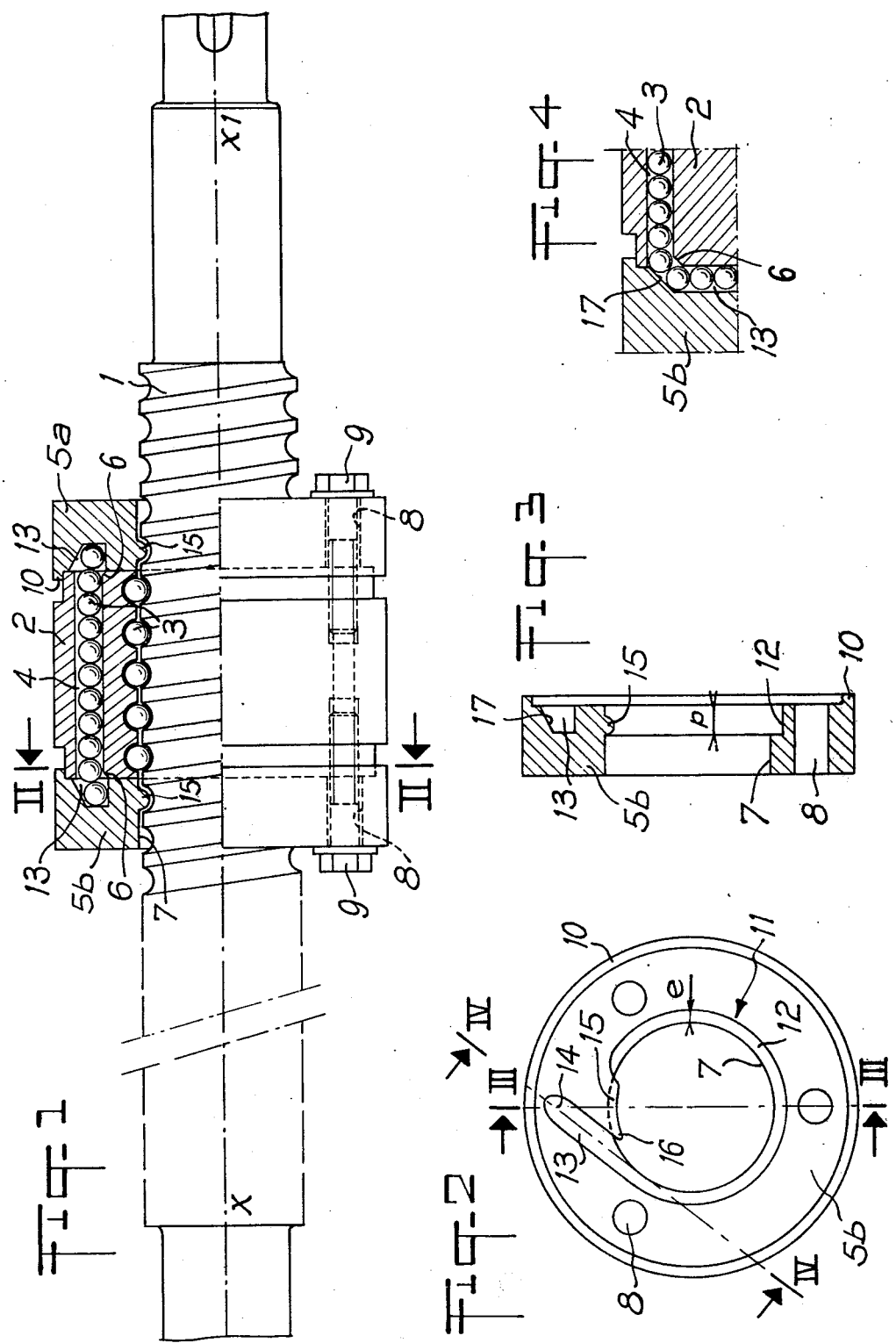

BALL SCREW

This invention relates to a mechanism for converting rotary motion into translatory movement, and more particularly relates to such a device of the type comprising a screw threaded shaft, a hollow sleeve member positioned on the shaft and internally threaded with a thread having the same pitch as the thread of the shaft, and a plurality of balls disposed in the channels defined between the shaft and hollow member by the threads. Mechanisms of this type generally include a device for transferring the balls between the opposite ends of the hollow member.

It is known that such mechanisms have very high mechanical efficiencies and can bear large loads, which make it possible to obtain very high yields and to shift heavy loads using a very low torque input. In addition they are wear resistant and exhibit very little play, and for these reasons, they are particularly suited for use in precision mechanisms and precision servo-mechanisms, on machine tools, in aircraft and naval construction, and in armament production.

In operation of the mechanism, the balls leave the channel at one end of the hollow member and are conveyed by the transfer device to the other end of the member where they are fed into the channel.

Various devices for effecting this transfer of the balls are known. In one construction, for example, two transverse holes are drilled into the hollow member such that the inner ends of the holes join the groove of the thread tangentially. A channel links these two holes, and is machined in the inner surface of a part which fits on to the sleeve member. The channel generally has a sinuous path which complicates the machining operations.

There are also known ball transfer devices which comprise bevelled, curved tubes fixed to the end walls of the sleeve member, or which use inserted parts which fit into the hollow sleeve member.

All these known methods of transferring the balls require precision-machined mechanical parts and are therefore expensive to produce.

In accordance with the present invention there is provided a drive transmitting mechanism for converting rotary motion into translatory movement comprising a screw threaded shaft, an internally threaded hollow sleeve member surrounding the shaft, the threads of the shaft and sleeve being of the same pitch whereby they define a helical passage between the shaft and sleeve, a plurality of balls located in the passage and means for transferring the balls between opposite ends of the passage including longitudinally extending bore in the sleeve wall having a diameter greater than that of the balls, and two identical annular end plates secured to either end of the sleeve and surrounding the shaft, each end plate having a central bore and, on its surface facing the sleeve, an arcuate recess coaxial with the central bore and a groove, an inner end of which communicates with and is tangential to the recess, and the other end of which communicates with one end of the sleeve bore, the recess being formed by a central bore portion of increased radius and having a radial depth greater than the radius of the balls and an axial width greater than the diameter of the balls.

With this construction the device for recirculating the balls does not demand any precisionmachining and its production cost can be lower than for the known devices described above.

Once the balls have left the channel they are no longer subjected to the mechanical stresses arising from the transfer of loads between the sleeve and the shaft, and the only forces present result from the weight, friction and the kinetic energy of the balls. The energy to be provided for transferring the balls is thus low and the reaction forces on the elements are not high, so it is unnecessary to employ channels for the balls, which have precise dimensions and are carefully machined from metal parts which possess high mechanical strength.

Consequently none of the parts which make up the transferring means requires precise machining. The longitudinal bore through the box can be drilled by means of a bit or a drill having a diameter which is larger than the diameter of the balls by 1 to 3 tenths of a millimeter.

The end plates are preferably moulded from a self-lubricating plastics material, such as polyamide, polytetrafluoroethylene or any other equivalent polymerisable resin. The recess and groove in each end plate can be left as moulded without machining. In this embodiment the end plates can additionally form the seals between the ends of the sleeve and the threaded shaft.

In a preferred embodiment of the invention a projection is provided on the end plate and projects inwardly between axially adjacent thread portions of the shaft. The projection preferably has a cross-section which corresponds to that of the threads of the shaft, and a forward end of the projection is located adjacent the inner end of the groove.

Whereas the cost of manufacturing the known mechanisms is very high, due to the high-precision machining work necessary, the mechanism according to the invention can be produced at a much lower cost.

The end plates can be mass-produced and, by reason of the large tolerances permitted on the depth and width of the recess and groove in relation to the diameter of the balls, it is possible to use the same end plates with shaft and sleeve combinations which have the same diameters but have a thread pitch which is different by several millimeters.

The end plates, if they are made of plastics material, can act as the scrapers usually placed at the ends of the sleeve, and this again reduces the production cost of the mechanism.

The end plates can be thin and their small space requirement makes it possible to use the mechanism in installations where space and weight considerations are important.

A mechanism embodying the invention is described below by way of example with reference to the accompanying drawings, in which:

FIG. 1 is an elevational view of the device shown partly in cross-section;

FIG. 2 is an end view of an end plate, taken along the line II—II of FIG. 1;

FIG. 3 is a cross-section taken along the line III—III of FIG. 2; and

FIG. 4 is a detailed section taken along the line IV—IV of FIG. 2.

FIG. 1 shows a mechanism which consists of a threaded shaft 1 with an axis $x$-$x1$, an internally threaded hollow sleeve member 2 and balls 3 located in the helical passage defined between the sleeve and the shaft.

As the sleeve rotates relative to the screw, the balls leave the passage at one end of the sleeve and are transferred to the other end of the sleeve where they are fed into the passage.

The ball transferring arrangement consists of a bore 4 which extends longitudinally through the wall of the sleeve and two end plates 5a and 5b. The diameter of the bore 4 is greater than that of the balls 3, and can be drilled by means of a drilling machine without precision-machining. If the balls have a diameter of 5 mm, for example, the bore 4 will have a diameter of 5.2 or 5.3 mm. The ends of this bore have a small chamfer 6 of 45°, at least on the edge nearest the shaft.

The end plates 5a, 5b are identical and each has a central bore 7, through which the shaft 1 passes, and three uniformly spaced fixing holes 8. Bolts 9 are passed through the holes 8 and screwed into the sleeve to secure the end plates on the sleeve.

To ensure that the end plates are properly cented on the sleeve they are provided with annular projections 10 in which the opposite ends of the sleeve are received.

Each of the end plates has a recess 11 which serves to guide the balls between the helical channel and the bore 4. This recess consists in part of an increased diameter portion 12 of the central bore 7 which extends around about three quarters of the full circumferential extent of the bore. The radial depth "e" of recess portion 12 is greater than the radius of the balls and its axial width "p" is greater than the diameter of the balls. For example, for balls with a diameter of 5 mm, $e = 2.6$ mm and $p = 5.5$ mm, with tolerances greater than a tenth of a millimeter. The recess portion 12 merges into a tangential groove 13 having a depth equal to the axial width of the portion 12. The width of this groove is greater than the diameter of the balls. For example, for balls of 5 mm diameter, the slot 13 has a width of 5.2 mm with a tolerance greater than 0.1 mm. The outer end 14 of the groove 13 is adjacent one end of the bore 4 so that balls can transfer between the bore and the groove.

Each end plate is fitted with an inwardly directed stop 15 which serves to guide the balls into the groove 13, the end 16 of the stop adjacent the inner, open end of the groove 13, engaging the shaft threads to force the balls to enter the slot 13. As seen best in FIG. 3, the cross-section of the stop 15 matches that of the threads of the screw. The stop 15 is optional but is desirable if the threads are deep compared with the ball diameter. Stops are mainly used on end plates which are moulded due to difficulties in production by machining.

As shown in FIG. 4, the outer end wall 17 of the groove 13 is inclined at an angle of 45° in order to facilitate the passage of the balls from the groove into the bore 4. The end of the bore 4 has a chamfer 6 which is parallel to the end wall 17 of the groove and also assists in this respect.

When the sleeve is rotated relative to the shaft, the balls in the helical channel at the forward end of the sleeve successively enter the recess 12 and are then pushed into the groove 13 of the end plate attached to that end of the sleeve. The balls pass into the bore 4 from the groove 13.

At the same time balls leave the bore at the other end and are pushed into the groove 13 of the end plate at that end. From the groove the balls enter the recess portion 12 and then the channel defined between the sleeve and the shaft. Of course, when the sleeve is rotated in the opposite direction, the balls move in the same manner, but in the opposite direction.

The width and depth of the various channels and bores, which the balls travel along during their transfer between opposite ends of the channel, allow high tolerances and they can therefore be produced by machining with low accuracy. In particular, the end plates can remain as moulded and, since they do not support any mechanical load, they can be moulded from a self-lubricating plastics material, for example, by injection moulding. This has the additional advantage that the end plates can be combined with the scrapers with which they form one and the same part.

We claim:

1. A drive transmitting mechanism for converting rotary motion into translatory movement comprising, a screw threaded shaft, an internally threaded hollow sleeve member surrounding said shaft and having opposed flat ends, the threads of said shaft and sleeve having the same pitch whereby they define a helical passage between said sleeve and shaft, a plurality of balls of substantially the same diameter located in said passage, and said passage having opposite ends respectively located adjacent the opposed ends of said sleeve; a single pair of identically shaped one piece molded end plates respectively secured to said opposed ends of said sleeve having a central bore receiving said shaft; and means for transferring said balls between said opposite ends of said helical passage, said means consisting of a longitudinal bore extending through the sleeve parallel to said shaft between said opposed ends of the sleeve and having a diameter greater than that of said balls and said end plates having substantially flat end surfaces facing respectively toward and mating with their associated flat end of the sleeve, each of said flat end surfaces of the end plates facing said sleeve having an arcuate recess formed therein consisting of a counter bore coaxial with and extending radially outwardly over only a part of the periphery of said central bore and a groove opening towards the adjacent flat end face of the sleeve and having an inner end which communicates with and is tangential to said arcuate recess and an opposite outer end which communicates with the end of said sleeve bore in the adjacent end of the the sleeve; said arcuate recess having a radial depth greater than the radius of the balls and an axial width greater than the diameter of the balls; said groove in said end plates having a greater cross section than the cross section of said balls to allow said balls to pass therethrough.

2. A mechanism according to claim 1, wherein the arcuate recess in each of said end plates has end portions and each of said end plates has a projection formed therein between the ends of said arcuate recess, said projections projecting radially inwardly into said central bore of the end plates between adjacent thread portions of said shaft to guide movement of balls between said arcuate recess and said tangential groove.

3. A mechanism according to claim 2, wherein said projection has a cross-sectional shape which corresponds to the cross-sectional shape of the threads of said shaft.

4. A mechanism according to claim 2, wherein said projection has a forward end located adjacent said inner end of said groove.

5. A mechanism according to claim 1, wherein the said end plates are moulded from self-lubricating plastics material and form seals between said sleeve and shaft.

6. A mechanism according to claim 1 wherein the outer end of each of said grooves is bevelled at about 45° towards the adjacent face of said sleeve and said sleeve at each of its ends has a bevel formed therein adjacent the end of said longitudinal bore which is parallel to the bevel in the groove thereby to provide a transition zone for balls passing hetween the groove and longitudinal bore in the sleeve.

* * * * *